July 20, 1965 E. LINSKER 3,195,704
TORQUE RESPONSIVE CONTROL FOR MOTOR DRIVEN TOOL
Filed Aug. 2, 1962 3 Sheets-Sheet 3
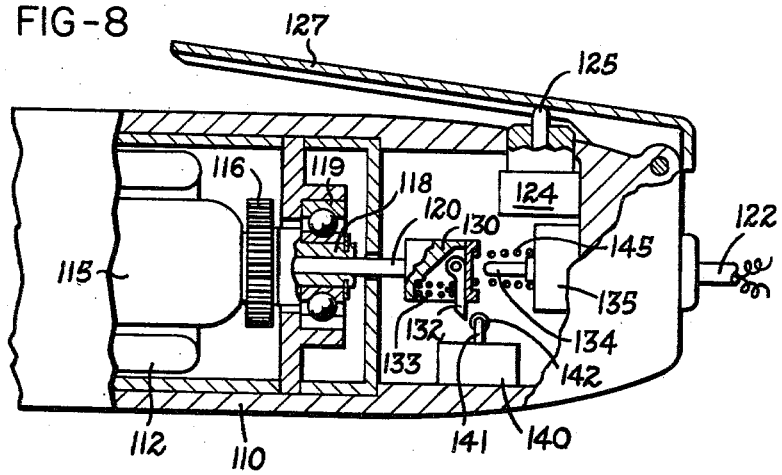
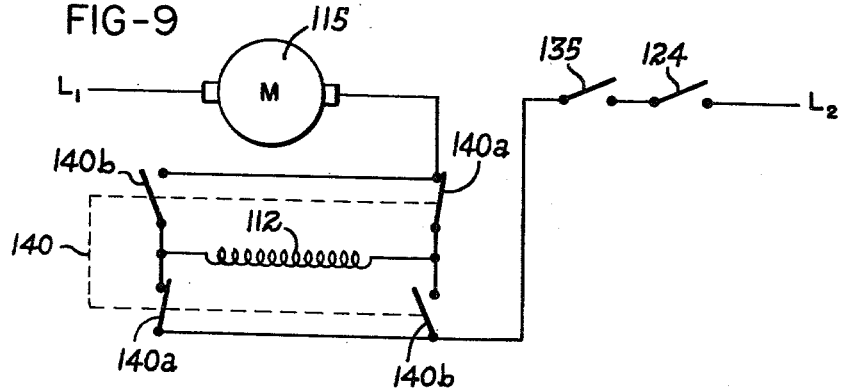
INVENTOR.
EUGENE LINSKER
BY
Marechal, Biebel, French & Bugg
ATTORNEYS United States Patent Office 3,195,704
Patented July 20, 1965

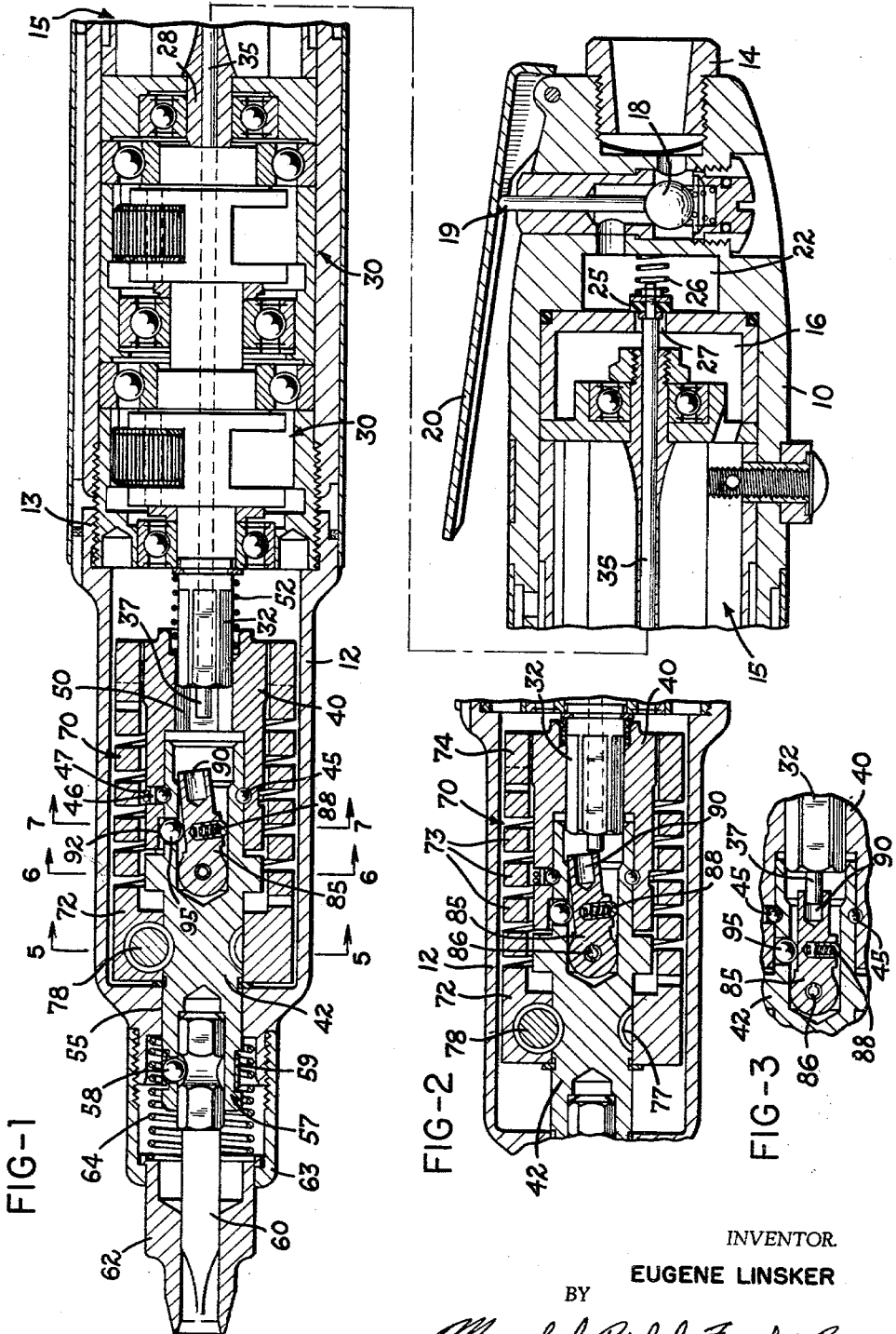

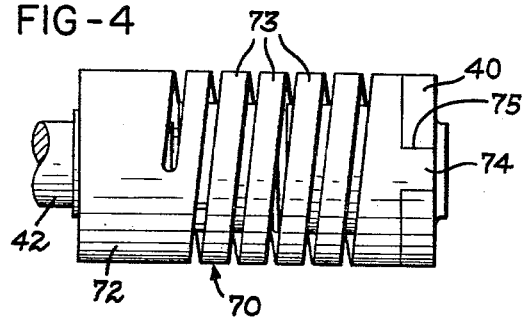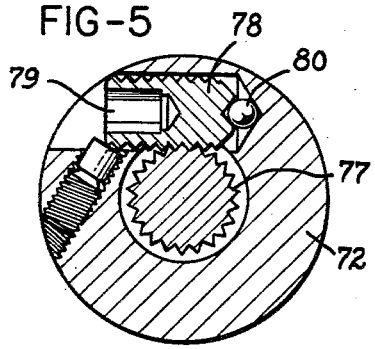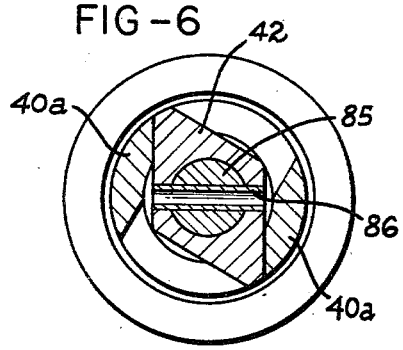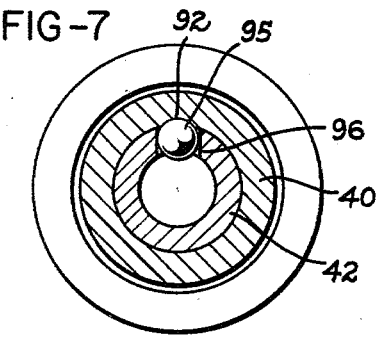

3,195,704
TORQUE RESPONSIVE CONTROL FOR
MOTOR DRIVEN TOOL
Eugene Linsker, Dayton, Ohio, assignor to Rockwell
Manufacturing Company, Pittsburgh, Pa., a corporation
of Pennsylvania
Filed Aug. 2, 1962, Ser. No. 214,293
10 Claims. (Cl. 192—150)

This invention relates to torque responsive controls, and to such a control for power operated fastener driving tools.

There are numerous demands for accurate, simply constructed, torque responsive controls. In many jobs to which power fastener driving tools are applied it is desirable to set the fasteners with a predetermined torque, and to have a substantially uniform setting for each fastener. Numerous devices have been proposed for this purpose. Many of them, however, are of rather large size, and thus not adaptable to the small size and weight restrictions of portable, particularly hand operated, fastener driving tools.

If attempts are made to adapt such larger devices to the small portable tool applications merely by decreasing the size of the parts, in many cases various parts are subjected to high stresses, or are required to accommodate high force components (particularly in change of motion devices), and the scaled down parts are unable to accomplish their function reliably and for a suitable life. Moreover, in scaling down such larger torque responsive controls, the accuracy of torque response very often is diminished to such an extent that the control responds over rather a wide range of torque, and in effect does not provide the required substantially uniform torque settings which such devices are supposed to accomplish.

Therefore, the primary object of the present invention is to provide a novel torque responsive control in which there are essentially no high stresses in the moving parts of the control apparatus.

Another object of the invention is to provide a torque responsive control, particularly for portable hand operated power fastener driving tools, which is capable of achieving a substantially uniform torque control to a greater capacity than comparable known devices of about the same given dimensional profile.

A further object of the invention is to provide such a torque responsive control in which none of the components are required to transmit relatively high forces through a change of motion mechanism, thereby providing a control which exhibits long life and better uniformity of response.

An additional object of the invention is to provide a novel torque responsive control, particularly as applied to electrically powered tools, wherein a braking effect is obtained along with a predetermined torque responsive power cut-off to minimize inertia forces, especially when the torque is adapted to a portable hand tool.

Other objects and advantages of this invention will be apparent from the following description, the accompanying drawings and the appended cliams.

In the drawings:

FIG. 1 is a broken longitudinal section through a power fastener driving tool incorporating the novel torque responsive control of the present invention;

FIG. 2 is a longitudinal section similar to FIG. 1, but of the torque responsive assembly only, showing the parts in another position;

FIG. 3 is a detailed longitudinal section through the release control parts of the torque responsive assembly;

FIG. 4 is a plan view of the torsion spring torque sensing mechanism utilized in the present invention;

FIG. 5 is an enlarged sectional view taken on line 5—5 of FIG. 1;

FIG. 6 is an enlarged sectional view taken along line 6—6 of FIG. 1;

FIG. 7 is an enlarged sectional view taken on line 7—7 of FIG. 1; and

FIGS. 8 and 9 show a modified form of the invention as applied to an electrically powered tool, and illustrating an arrangement for applying a braking action.

Referring to the drawings, which illustrate a preferred embodiment of the present invention, the power fastener driving tool includes a main body or housing 10 which carries the drive parts, including the motor and gear reduction units, as will be described. A nose piece or housing 12 is fastened, as by threading shown at 13, to the front end of housing 10, providing a support for the torque responsive control. The tool is illustrated and described as a pneumatic tool, utilizing compressed air which is supplied through the fitting 14 for power. It should be understood, however, that the present invention is applicable to other types of drive, and that for instance an electric rotary motor could be substituted for the vane type pneumatic motor shown generally at 15.

The primary supply of compressed air to the motor supply chamber 16 is through a spring loaded manually operated valve 18 which is normally urged closed, and which is opened by a pin 19 arranged to be depressed when the operator squeezes the control handle 20 toward the body or housing 10 of the tool. Such opening of the main valve 18 admits air under pressure to the control chamber 22.

In this chamber there is a power control means in the form of a further valve 25 normally seated by spring 26 to close the passage 27 into the motor supply chamber 16. Thus, even when the main valve 18 is open, the control valve 25 can cut off all power supply to the motor 15.

The motor output shaft 28 is connected, for example, through two or more stages of reduction gearing (indicated generally at 30), to an output or drive shaft 32. In the type of construction shown this drive shaft is coaxial with the motor shaft 28, although it should be understood that this arrangement is not essential. In any event, a control rod 35, fastened at one end to the control valve 25, extends through the motor shaft 28, through the reduction gearing, if used, and through the drive shaft 32, the other end 37 of the control rod projecting beyond the end of drive shaft 32 and terminating there, as shown particularly in FIG. 1.

The torque responsive control or shut off assembly includes a drive body 40 and a driven body 42, both of which are hollow, arranged in telescoped relation. A plurality of balls 45 are mounted in complementary races formed in the bodies 40 and 42, and are held in place by a cap 46 and surrounding snap ring 47, thus permitting relative rotation between the two bodies while securing them for simultaneous longitudinal movement. The drive body is provided with a hexagonal opening 50 dimensioned to receive the hexagonal end of drive shaft 32, and thereby providing a mounting and connection for the torque responsive assembly which is in effect a spline, causing the drive body 40 to rotate with the drive shaft while permitting movement of the drive body along the axis of rotation of the shaft. The drive body is normally urged forward, toward the nose of the tool, by a relatively light reset spring 52.

The forward end of the driven body 42 is rotatably and slidably mounted in a bore or passage 55 formed in the nose piece 12. This forward portion of the driven body includes an adapter construction, indicated generally at 57, and including a central passage and a retaining ball 58 held in place by a spring band 59, which is arranged to receive different types of fastener driving bits or sockets or other similar tools. For purposes of illustration, an ordinary driver bit 60 for a slotted-head screw is shown mounted in the adapter, and thus arranged to be rotated by the driven body 42. The nose of the bit is surrounded by a finder sleeve 62 which is slidable along the bit and within a cap 63. A light spring 64 normally pushes the sleeve to its fully extended position, as shown. Other bits or drive sockets can, of course, be used, depending on the type of fastener being set.

The drive body 40 is connected to the driven body 42 for purposes of rotary transmission by a relatively heavy torsion spring 70. Details of this spring are shown also in FIG. 4. Preferably, the spring is formed as a unit which is machined from a single piece, or cast, and includes a base section 72, a number of coils 73, and an end piece which provides one or more driving tangs 74 which are adapted to fit into slots 75 formed on the drive body 40. The base part 72 of the spring surrounds a worm construction 77 which is formed about the driven body 42, and a small worm gear 78, including a driving socket 79, is in threaded engagement with the worm formation 77. Preferably, a thrust ball 80 is included at the tip of the worm gear to minimize the frictional resistance to rotation thereof.

The torque responsive device can be assembled separately from the tool, and the worm gear or screw 78 turned to preset the spring 70 with a predetermined force. This can be accomplished with the use of a conventional torque wrench or the like to check the preload imposed on the spring, although experience with the tools has indicated that satisfactory results can be obtained on the job by trial-and-error methods until the desired torque responsive shut off is obtained, after which the tool will continue to limit its torque output to this same amount.

A release member 85 is pivotally mounted on the driven member 42, within the cavity therein, by means of a suitable hollow pin 86. This release member is normally urged to a cocked or set position, shown in FIGS. 1 and 2, by a small transverse spring 88. The release member has a pocket 90 formed therein which is dimensioned to receive the projecting end 37 of the control rod, but in its cocked position the release member is held such that the pocket is not aligned with the rod, and an edge of the release member will engage the end of the rod as shown in FIG. 2.

Therefore, when the operator presses the tool on a fastener and exerts a downward force, this will cause the bit to transmit a thrust force to the drive and driven bodies of the torque responsive assembly, moving the entire assembly against the light positioning spring 52, and during this motion the release member will engage the end 37 of the control rod, forcing it rearward of the tool to open valve 25. Providing the operator has squeezed the trigger handle 20 to open valve 18, the motor will then run causing the bit to drive the fastener.

During this driving operation the spring 70 transmits the force necessary to rotate the bit. As soon as the torque being transmitted through the spring exceeds its preload value, the spring will begin to "wind up" and the drive body 40 will commence to rotate relative to the driven body 42. At this time, referring to FIG. 7, a cam formation 92 in the drive body 40 acts against a sensing member ball 95 positioned within a hole 96 in the driven body 42 opposite the release member 85, forcing the ball inwardly and overcoming the cocking force of spring 88 until the pocket 90 is moved into alignment with the end 37 of the control rod 35. The spring 26 then immediately drives the control valve shut, carrying the rod 35 forward so that its end is received in the pocket 90, as shown in FIG. 3.

When the operator lifts the tool from the fastener, since the operation of the motor has been stopped, the reset spring 52 will move the entire torque responsive assembly forward approximately to the position shown in FIG. 1. The spring 70 having unwound the cam formation 92 will again receive the sensing ball 95, which is in turn forced outward by the action of the cocking spring 88 to reset or cock the release member 85.

From the foregoing, it will be seen that the present invention provides a torque control device which is particularly useful with power operated tools for setting fasteners and the like with a predetermined and essentially uniform torque. The torsion spring 70 is fixed or anchored at its opposite ends to the drive and driven bodies respectively, and this spring provides the sole resistance to rotative movement between these bodies. So long as the torque input from the drive shaft to drive body 40 can be transmitted by the spring to the driven body 42 without additional deflection, and thence through its adapter to the bit or socket used to drive the fasteners, the motor will continue to run. As soon as the resistance to rotation of the fastener is reflected as a resistance to rotation of the driven body in excess of the ability of the spring to transmit, without significant reflection, the torque applied to the drive body by shaft 32, this will result in a triggering movement of the sensing ball 95 and the release member 85 will function to release, through the control rod 35, the shutoff valve 25, which immediately moves to its normally closed position.

The torsion spring 70 transmits the driving torque which is ultimately applied to the bit or the other fastener driving tool. None of the cocking, release, or triggering mechanism is required to transmit any of the rather substantial forces which result from transmission of the driving torque. Accordingly, these parts, such as the members 85, 95, 92, 35 and valve 25 are only required to withstand those forces necessary to perform their controlling functions. This results in a tool having parts which exhibit long life characteristics, which can be constructed from relatively inexpensive materials while still obtaining the desired long life characteristics, as well as obtaining a torque responsive control device which occupies a relatively small volume, i.e., its profile dimensions are minimized as much as possible, while obtaining greater torque transmitting capacity and better accuracy of response to a predetermined torque than present devices of the same physical size.

In addition, the simplicity of adjustment provided by the worm 78, which can be rotated by an ordinary Allen wrench to preset the torsion spring 70, enables the operator of the tool to preset its cutoff or shutoff point accurately and with ease. The operator can thus make this adjustment on the job to suit the characteristics of a particular type of fastener being used.

Referring particularly to FIG. 6, portions of the drive body 40, for example the jaws 40a, extend around that part of the driven body 42 which mounts the release member 85. These jaws are spaced apart sufficiently to permit substantial angular movement between the drive and driven bodies, to accommodate the yielding motion of the spring when the release torque is reached. However, when the motor 15 is operated in reverse (and this may be done by a conventional reversing mechanism, not shown), then since the driven body 42 is in contact with the jaws 40a, a direct reverse drive is in effect. This arrangement may be used advantageously to permit removal of damaged fasteners without being limited to the preload or preset torque at which the mechanism releases when driving a fastener, i.e., rotating in a forward direction.

Another feature of the invention resides in provision of the manually operated valve 18 which can override the automatic valve 25. For example, if the operator desires to use the tool, particularly its bit or socket, to align a fastener in a hole, or to employ the fastener as a pilot in aligning holes in a plurality of pieces of sheet metal to be connected by the fastener, he may do so by allowing the valve 18 to remain closed, and the pressure on the bit, which as explained will cause the valve 25 to unseat, but this will not cause the tool to drive until such time as the operator depresses or manipulates the handle 20.

It should also be realized that the torque responsive mechanism of the present invention is not limited to use with fastener driving tools, although it has been described in such use in a preferred embodiment. Other uses of the novel torque responsive control mechanism will be suggested to persons skilled in the art who desire a simply constructed apparatus, a relatively small profile for its capacity, which can be used to limit accurately the application of torque by a source of power. Such needs may exist, for example in protecting small electrical motors against excessive overloading, or in protecting some other types of rotary drives from excessive torque loads.

For example, FIGS. 8 and 9 show a modified form of the invention in an electrical control embodiment, and while this is shown as applied to a fastener driving tool, it will be apparent to those skilled in the art that other types of electrical drives can be controlled in like manner. In this embodiment the housing 110 carries an electrical motor, having a field winding 112, an armature 115, a commutator 116 (the brushes of which are not shown in FIG. 8) and a rotary shaft 118 which is supported at one end in the rear bearing 119. The control rod 120 extends through the motor shaft, and corresponds to the rod 35 shown in FIGS. 1–3. It will be understood that the torque responsive mechanism shown in FIGS. 1–3 is applied in like fashion to control the movements of rod 120, and thus details of such construction are not repeated.

The electrical power may be supplied through the cord 122, and may be, if desired, under the primary control of a switch 124 having an operating pin 125, and which is normally open to cut off the supply of power to the motor. The power can be obtained from an ordinary electrical supply, or from a portable battery power pack, or it is possible to have a battery incorporated in the tool itself. This switch is also shown schematically in the wiring diagram of FIG. 9. The manually operated handle 127 is arranged such that when it is squeezed against the body of the tool by the operator switch pin 125 is depressed to close switch 124.

On the end of rod 120 there is a control member 130, fixed thereto, and providing a pivot mounting for a further switch operating arm 132 which is normally urged by spring 133 into the position shown, where the arm depends from the member 130. When the operator thrusts the tool against the work, rod 120 moves rearward in the same manner as previously described in connection with FIG. 2 and the operation of the tool shown in FIGS. 1–7. This motion causes the member 130 to depress a plunger or pin 134 to close a normally open switch 135 and completes an electrical circuit to the motor. A further switch 140 is mounted to one side of the path of movement of the arm 132, and includes an operating pin 141 preferably having a roller 142 at its outer end.

The switch operating pin 141 is normally biased to the position shown (as by an internal spring not illustrated) and the force holding the switch pin in this position is sufficiently greater than the force of spring 133 that the pin 141 will not be depressed during such rearward movement of the member 130, and instead the arm 132 will pivot to swing over the roller 142.

Switch 140 is a reversing switch, and has four separate sets of contacts, shown diagrammatically in FIG. 9 as including the normally closed contacts 140a and the normally open contacts 140b. Thus, in its normal condition, this switch connects the field winding 112 of the motor in one sense with respect to the armature winding for producing a forward rotation of the motor. When switch 140 is operated these contacts are reversed and the field winding connections are reversed with respect to the armature winding 115, creating a reverse E.M.F. in field winding and thus producing a braking action in the forwardly rotating motor.

Accordingly, as the rod 120 is released to move forward under the bias of spring 145, when the torque responsive mechanism has been actuated, the member 130 is carried forward to open switch 135, but the timing is such that before this switch is opened the arm 132 momentarily depresses the actuating pivot 141 of switch 140, causing a momentary reverse connection of the field winding as explained, and thus producing a reverse E.M.F. in the motor which in turn causes a braking action. In the case of a portable hand held tool this momentary reversing or braking action will tend to counteract the reaction forces otherwise transmitted through the body of the tool to the operator. In addition, this counteraction to the inertia forces in the operating mechanism of the tool will tend to minimize any overtravel of the driving parts of the tool, and thus will contribute to the uniformity of torque responsive control obtained from the mechanism.

While the forms of apparatus herein described constitute a preferred embodiment of the invention, it is to be understood that the invention is not limited to these precise forms of apparatus, and that changes may be made therein without departing from the scope of the invention which is defined in the appended claims.

What is claimed is:

1. A power fastener driving tool having a torque responsive control, comprising a motor, control means for the supply of power to said motor, a drive shaft rotatable by said motor, a drive body connected to said drive shaft for rotation therewith and for movement along the axis of rotation of said drive shaft, a driven body mounted for relative rotation with respect to said drive body and having an adapter for holding a tool such as a fastener driver bit, a control rod having one end adapted to operate said power supply control means and terminating at its other end adjacent to said driven body, a torsion spring connected at opposite ends to said drive body and to said driven body to resist relative rotation therebetween with a predetermined force, a release member carried by said driven body and having a pocket in one end thereof for receiving said other end of said rod, means normally cocking said release member to a position offset from said rod for causing an edge of said release member to engage said rod and to push said rod for actuating said power supply control means to initiate operation of said motor, and a means for sensing relative rotation between said driving body and said driven body in response to overcoming the resisting force of said spring and for causing said release member to move until its said pocket is aligned to receive said other end of said rod allowing a power shutoff movement of said rod.

2. A torque controlled power fastener driving tool comprising a motor, control means for the supply of power to said motor, a drive shaft rotatable by said motor, a drive body carried on said drive shaft for rotation therewith and for movement along the axis of rotation of said drive shaft, a hollow driven body rotatably mounted on said drive body and having an adapter for holding a tool such as a fastener driver bit, a control rod extending through said shaft connected at one end to said power supply control means and terminating at its other end adjacent to said driven body, a torsion spring connected at opposite ends to said drive body and to said driven body to resist relative rotation therebetween with a predetermined force, a release member pivotally mounted in said driven body and having a pocket in one end thereof facing said other end of said rod, means normally cocking said release member to a position offset from said other end of said rod for causing an edge of said release member to engage said rod and to push said rod in response to axial movement of said bodies along said shaft for actuating said power supply control means to initiate operation of said motor, and a means for sensing relative rotation between said driving body and said driven body operative on said release member to move said release member until its said pocket is aligned to receive said other end of said rod allowing a power shutoff movement of said rod.

3. A power fastener driver having a torque responsive control for limiting the torque applied to a fastener, comprising a pneumatic rotary motor, a drive shaft rotatable by said motor, a valve connected to control the supply of pressure fluid to said motor, means urging said valve to a closed position, a control rod connected to said valve and extending through said drive shaft terminating beyond an end thereof and slidable within said drive shaft, a torque responsive shutoff assembly including a drive body and a driven body arranged for relative rotation with respect to each other and mounted on said one end of said drive shaft for movement as a unit along said drive shaft, said drive and driven bodies having a cavity formed therein receiving said end of said drive shaft and surrounding the projecting end of said control rod, a torsion spring connected at its opposite ends to said drive body and to said driven body to resist relative rotation therebetween with a predetermined force, a release member pivotally mounted on said driven body within said cavity and having a pocket therein facing said end of said control rod for receiving said end of said control rod, spring means normally cocking said release member offset from said rod to position an edge of said release member in alignment with said end of said control rod for causing said release member to move said rod axially and to open said valve upon axial movement of the entire said torque responsive assembly on said drive shaft, a sensing member engaging said release member and carried by one of said bodies, and a cam formation on the other said body engaging said sensing member and adapted upon relative rotation between said driving body and said driven body in response to yielding of said spring to move said sensing member against said release member aligning said pocket with said end of said control rod and releasing said valve for movement to close off the supply of pressure fluid to said motor.

4. A power fastener driving tool comprising a pneumatic rotary motor, a drive shaft rotatable by said motor, a spring closed valve connected to control the supply of pressure fluid to said motor, a control rod connected to said valve and slidably mounted in said drive shaft projecting beyond an end thereof, a torque responsive shutoff assembly comprising a drive body and a driven body connected together for relative rotation with respect to each other and mounted on said one end of said drive shaft for movement as a unit along said drive shaft, said drive and driven bodies having a cavity formed thereon communicating with said end of said drive shaft and surrounding the projecting end of said control rod, a torsion spring connected at its opposite ends to said drive body and to said driven body to resist relative rotation therebetween with a predetermined force, a release member pivotally mounted on said driven body within said cavity and having a pocket therein facing said projecting end of said control rod and dimensioned to receive said end of said control rod, spring means normally cocking said release member to move said pocket out of alignment with said end of said control rod for causing an edge of said release member to move said control rod axially and to open said valve upon axial movement of the entire said torque responsive assembly on said drive shaft, means urging said shutoff assembly in a direction away from said end of said rod to leave said valve in a closed position, a bit holder on said driven body for transmitting thrust from engagement of a bit with a fastener to move said shutoff assembly toward said end of said rod, a sensing member engaging said release member and carried by one of said bodies, and a cam formation on the other said body engaging said sensing member and adapted upon relative rotation between said driving body and said driven body in response to yielding of said spring to move said sensing member against said release member aligning said pocket with said end of said control rod and releasing said valve for movement to close off the supply of motive fluid to said motor.

5. In a power operated tool for setting fasteners and the like with a predetermined torque, said tool having a fluid motor connected to rotate a drive shaft and having a spring loaded normally closed valve providing the ultimate control means for supply of motive fluid to said motor, the combination of a drive body and a driven body, mounting means connecting said bodies providing for relative movement therebetween only in rotation, a torsion spring fixed at its opposite ends to said drive and said driven bodies respectively providing the sole resistance to rotative movement between said bodies, a rotary drive connection adapted to transmit torque from the drive shaft to said drive body, an adapter on said driven body for mounting a fastener driving tool to rotate the same through application of torque by said spring from said drive body to said driven body, sensing means operative to sense rotative movement between said bodies in response to a resistance to rotation of said driven body in excess of the ability of said spring to transmit torque applied to said drive body without significant deflection, a control connection including a normally cocked release means operative to open said valve in response to thrust exerted on said bodies by application of a tool in said adapter to a fastener for initiating the supply of motive fluid to said motor, and a connection between said sensing means and said release means arranged to shut off the supply of motive fluid to the motor by releasing said valve to its normally closed position when said sensing means detects such rotative movement between said bodies.

6. A power operated tool for setting fasteners as defined in claim 5, including a manually operable valve means connected to control the supply of motive fluid to said spring loaded normally closed valve for preventing, at the option of the operator, the supply of motive fluid to said motor when said spring loaded valve is open.

7. A power operated tool for setting fasteners and the like as defined in claim 5, in which said fluid motor is reversible, and a reverse direction drive connection between said drive body and said driven body providing for a direct drive in reverse to the normal direction of drive from said drive body to said adapter for rotating fasteners in such opposite direction independently of control by the torque responsive mechanism.

8. A power fastener driving tool as defined in claim 1, wherein said motor is a fluid motor, and wherein said power supply control means is a valve member connected to said other end of said control rod.

9. A power fastener driving tool as defined in claim 1, wherein said motor is an electric drive motor, and wherein said power supply control means includes a switch connected to control the supply of electrical power to said motor, and a control member connected to said other end of said control rod is arranged to actuate said switch.

10. A power fastener driving tool as defined in claim 9, including a reversing switch also connected in circuit with said motor and arranged to reverse the power connections of said motor, and wherein said control member includes means arranged to actuate said reversing switch to produce a braking action by said motor and a subsequent opening of said control switch to cut off the power to said motor.

References Cited by the Examiner

UNITED STATES PATENTS

| | | | |
|---|---|---|---|
| 2,756,622 | 7/56 | La Belle | 192—150 |
| 2,764,272 | 9/56 | Reynolds | 192—150 |
| 2,960,864 | 11/60 | Watts | 81—52.35 |
| 2,964,151 | 12/60 | Eckman | 173—12 |
| 2,973,067 | 2/61 | Eddy | 192—150 |
| 3,006,446 | 10/61 | Harrison et al. | 192—30.5 |
| 3,082,742 | 3/63 | Vilmerding et al. | 192—150 |

DAVID J. WILLIAMOWSKY, *Primary Examiner.*